United States Patent [19]
Lightstone et al.

[11] 3,878,787
[45] Apr. 22, 1975

[54] CRYOGENIC EXPLOSIVE FRAGMENTATION

[75] Inventors: John Bernard Lightstone, White Plains; Jaak Stefaan Van den Sype, Mount Kisco; Richard Benedict Mazzarella, Peekskill, all of N.Y.

[73] Assignee: Union Carbide Corporation, New York, N.Y.

[22] Filed: Aug. 23, 1972

[21] Appl. No.: 282,976

[52] U.S. Cl. ............... 102/23; 241/17; 241/DIG. 9
[51] Int. Cl. .................................................. F42b 3/00
[58] Field of Search .......... 241/1, 3, 17, 23; 299/13; 102/22, 23, 24 HC

[56] References Cited
UNITED STATES PATENTS

| | | | |
|---|---|---|---|
| 2,704,514 | 3/1955 | Barlow et al. | 102/23 |
| 2,704,515 | 3/1955 | Barlow | 102/23 |
| 2,839,435 | 6/1958 | Boswell | 102/23 |
| 3,104,186 | 9/1963 | Lindbergh et al. | 102/24 HC |
| 3,643,873 | 2/1972 | George | 241/3 |
| 3,666,185 | 5/1972 | Williams | 241/17 |

*Primary Examiner*—Verlin R. Pendegrass
*Attorney, Agent, or Firm*—Bernard Lieberman

[57] ABSTRACT

A process for fragmenting materials, such as ferrous scrap, which become substantially embrittled at cryogenic temperatures comprising the steps of:
a. chilling the material to be fragmented to a temperature at which it is substantially embrittled, and
b. detonating an explosive proximate to the material so as to fracture it.

The process is particularly suitable for the fragmentation of automobile hulks and for the recovery of copper metal from copper bearing scrap such as, motors and generators. The process is also useful in the demolition of structures, such as buildings and bridges by fracturing its supporting structural members.

11 Claims, 2 Drawing Figures

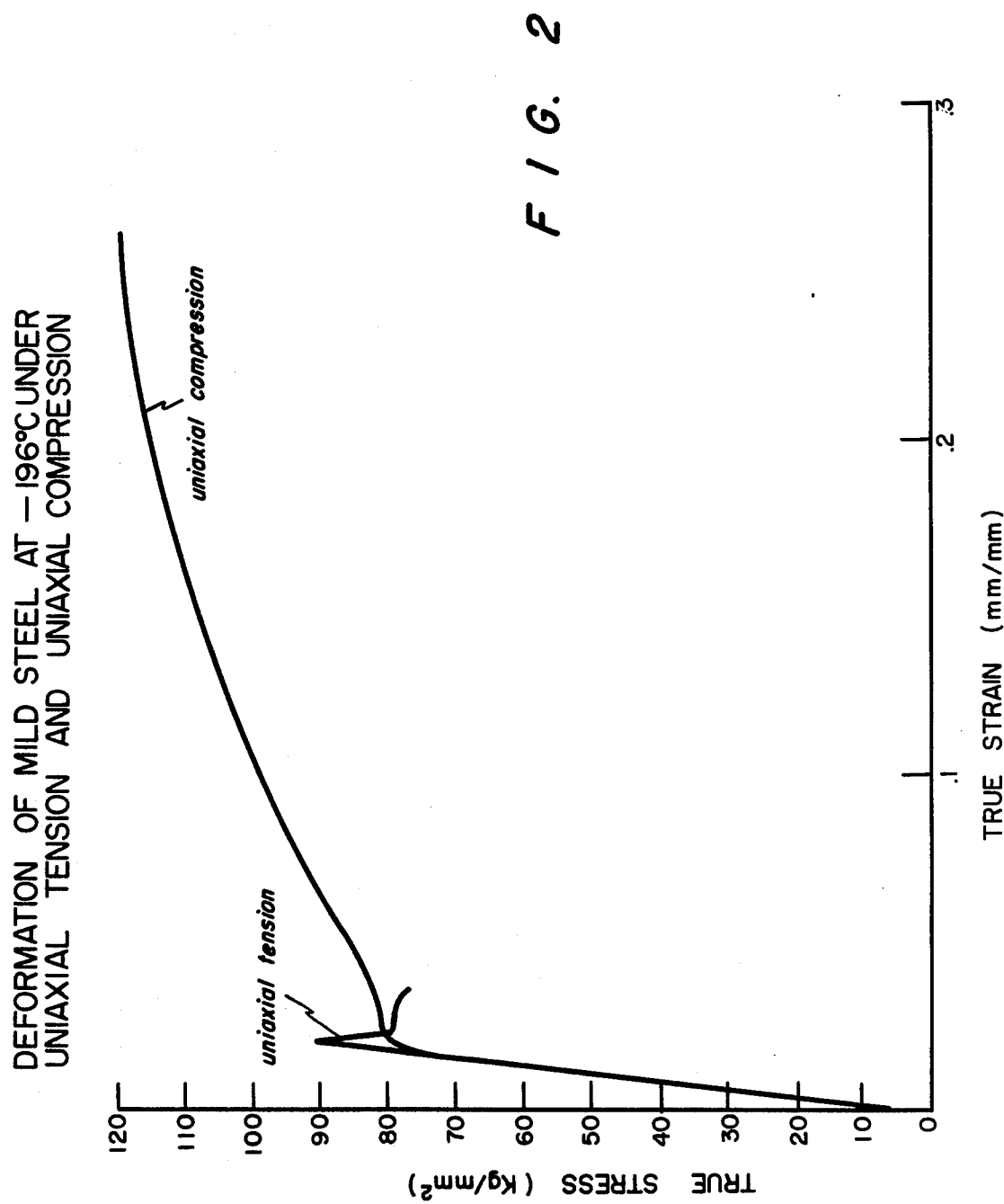

CRYOGENIC EXPLOSIVE FRAGMENTATION

BACKGROUND

This invention relates to cryogenic fragmentation, and more particularly, to a method wherein the fragmentation is effected by means of an explosive discharge.

The growing stockpiles of discarded automobiles have focused attention on methods for efficiently disposing of automobile hulks while reclaiming the scrap metal contained therein. The increased industrial interest in processes for reclaiming used metal is partially an outgrowth of public concern about the wasteful depletion of irreplaceable natural resources and is underscored by the fact that in the United States alone about 8,000,000 cars are discarded annually. This represents a vast reservoir of recyclable scrap metal. The emphasis has been primarily on recovering the predominant ferrous component of the scrap material and, in addition, on separating and recovering the non-ferrous metals, such as copper, having relatively high intrinsic value.

In order to up-grade automotive scrap to a commercially useful high quality steel scrap, it is generally necessary first, that non-metallic materials, such as upholstery, be removed from the car hulk and second, that the remaining metal be separated into its ferrous and non-ferrous components. Copper is frequently the most objectionable non-ferrous metal contaminant in steel scrap. That is, it adversely affects the properties of many steel products manufactured from reclaimed scrap metal. Therefore, practically all of the copper wiring present in an automobile is preferably removed from the hulk so as to prevent it from being admixed with the steel.

Many processes have been used and suggested for recycling automobile scrap. In urban centers that discard at least 40,000 cars each year, the preferred method is a shredding operation wherein the automobile is first stripped of its radiator, battery, motor and seats and then fragmented in a large hammermill. The resulting metal fragments are then magnetically separated into ferrous and non-ferrous fractions thereby obtaining a steel scrap of about 0.25 wt. percent copper.

A process for fragmenting scrap metal has been disclosed in U.S. Pat. No. 3,643,873 to George wherein the automobile hulk is cooled with liquid nitrogen to between −60°and −120°C before it enters a conventional shredder. After shredding, the fragmented ferrous metal is separated magnetically from the non-ferrous metals.

Cryogenic shredding advantageously allows a more complete separation of the ferrous and non-ferrous fractions because the brittle fracture of the ferrous metal provides less of an opportunity for the physical entrapment of other materials, such as copper, in comparison with ambient temperature shredding operations. That is, at cryogenic temperatures the embrittled ferrous scrap shatters, for the most part, into small discrete fragments in contradistinction to the relatively large convoluted pieces of ferrous metal which result at ambient temperature. Thus, the problem of entrainment of non-ferrous materials in a deformed ferrous matrix is reduced by cryogenic fragmentation.

Although conceptually attractive, insofar as fragmenting at cryogenic temperatures is concerned, the process described by the George patent is nevertheless inefficient and uneconomical. Primarily, this is because George wastefully expends energy and refrigeration by fragmenting the scrap metal in a shredder. The inefficiency lies in the fact that only a relatively small fraction of the energy input to a hammermill is utilized for fracturing the metal — the remainder is wastefully expended as heat which is transferred to the scrap. This follows, in part, from the mechanical operation of a hammermill, which, to a significant extent, applies uniaxial compressive forces to the metal to be fragmented, yet, it is only the tensile component which can fracture the material. In other words, uniaxial compressive forces will merely deform a body but not fracture it, even at low temperatures. Apart from being an inefficient expenditure of energy, deformation of the metal is also undesirable because it generates heat and thereby raises the metal temperature. The increase in metal temperature decreases the recoverable refrigeration and therefore increases the overall refrigeration requirement.

OBJECTS

Accordingly, it is an object of the present invention to provide an efficient and economical process for fragmenting materials such as scrap metal at cryogenic temperatures.

It is another object of this invention to provide a process for enabling metal values to be reclaimed from scrap metal.

It is yet another object of this invention to increase the utility of the ferrous fraction of the metal generated so that its value as well as the quantity which steel makers can utilize are increased.

It is still another object of this invention to provide a process for the demolition of structures which presents a reduced risk of damage to neighboring structures.

SUMMARY OF THE INVENTION

These and other objects, which will become apparent from the detailed disclosure and claims to follow, are achieved by the present invention, one aspect of which comprises: a process for fragmenting a solid material which becomes substantially embrittled at cryogenic temperatures relative to its room temperature behavior comprising the steps of:

1. chilling the solid material to be fractured to a temperature at which it is substantially embrittled, and
2. detonating an explosive proximate to said chilled solid material so as to fracture said solid material.

An essential feature of the present invention is the fracture of the embrittled solid material by explosive force. This takes advantage of the fact that at cryogenic temperatures a desired product will be achieved with an unexpectedly small amount of explosive. Many benefits derive therefrom. In the case of automotive scrap, the energy released by detonating the required small amount of explosive proximate to the scrap at cryogenic temperatures gives rise to only a small temperature increase which allows the recovery of much of the refrigeration of the fragmented product. In the case of copper bearing scrap, such as electric motors and generators, the fact that the required amount of explosive is small allows the explosive to be placed in a previously prepared location within the motor or generator. This internal placement permits complete separation of the copper and ferrous components. By contrast, the amount of explosive necessary to achieve such separation at room temperature cannot reasonably be accomodated within the motor or generator. In the case of building demolition, the cryogenic preparation of the steel members allows the explosive forces required to accomplish demolition to be greatly decreased, thereby reducing the danger and damage to adjacent structures.

By properly positioning an explosive with respect to the solid material to be fragmented, a shock wave can be generated by the ensuing explosion which will produce, for the most part, tensile stresses in the solid material which are effective for accomplishing fracture. Therefore, in contrast to a conventional shredder, fragmentation by explosive detonation is inherently an efficient operation in that only a relatively small amount of the shock wave energy generated by the explosion results in plastic deformation of the solid material and raising of its temperature — a greater portion being effectively utilized for fracturing the material. This arises because the compressive stresses associated with the initial shock wave are predominantly hydrostatic, and do not result in plastic deformation, so that the tensile stresses which are subsequently developed accomplish fracture without appreciable prior plastic deformation. Moreover, the invention takes further advantage of the fact that the energy required to fracture a metal generally decreases with increased strain rates. Therefore, by using high explosives, very high strain rates may be achieved which favor a low energy fragmentation.

The efficiency of the present invention is also attributable to the fact that fragmentation is accomplished in a one-step operation, namely by a single explosion of one or more charges. This is beneficial in that, unlike in a conventional shredder, once the desired product is obtained, the various components of said product are not subsequently mixed and/or entangled in a way which hinders their subsequent separation. Furthermore, in a single step fragmentation process there is little opportunity for the material to be heated by friction or by the repeated conversion of elastic energy of deformation into heat.

Only small amounts of energy are required to fragment the material, so that the temperature rise during the fragmentation step is small. Consequently, unlike the process described by George, recovery of the refrigeration is economically feasible. Moreover, the invention is particularly well suited for recovering the refrigeration in the system because the material to be fragmented is not in contact with massive machinery, which is difficult to isolate thermally.

Although the present invention is particularly suitable for the fragmentation of various types of scrap metal as part of a recycling operation, the "solid material" to be fragmented, as that term is used throughout the disclosure and claims, need not necessarily be metal. The only restriction is that it become substantially embrittled at cryogenic temperatures relative to its room temperature behavior so that it will shatter under explosive impact. Thus, the term solid material includes, but is not limited to, body centered cubic metals and alloys, as well as plastics and rubbers. The solid material may also consist of more than one type of material.

The preferred location of the explosive charge in relation to the solid material to be fragmented will, of necessity, vary with the geometry of the solid material in question. However, the closer the explosive discharge is to the solid material, the more efficient will be the fragmentation. Also, the more centrally located, the better. Internal explosive loading is generally preferred whenever possible. For example, to accomplish the fragmentation of a hollow cylinder, the explosive is placed within the cylinder. For solid materials which do not permit an internal loading, placement of the explosive at the surface of the object at a point closest to its center of gravity is preferred. For more complex shapes of material, the optimum point for locating the charge is best determined by experimentation. Accordingly, the term "proximate to" as used herin is intended to include internal loading as well as placement of the explosive on the surface of the object.

The term "explosive" as used herein is meant to include all chemical high explosives such as nitroglycerine based explosives and pentaerythritoltetranitrate (hereafter called PETN) but is not necessarily restricted thereto. Any device capable of generating similarly high power densities will also be effective such as, for example, a high energy electric discharge.

The term "substantially embrittled" as used herein refers to the behavior of the material in an impact test, in which the energy absorbed to failure is measured. In one form of impact test, which is called a V-notch Charpy test, (ASTM Standards, PT. 31, 1970, Designation E23) the load is applied by the impact of a heavy swinging pendulum applied at the midspan of a beam of defined dimensions, which contains a standard notch. As the temperature is lowered, many materials show a decreasing energy absorbed to failure. This is typically shown in FIG. 1. The embrittlement of a material is defined in terms of this decrease in energy absorbed. A ductile to brittle transition temperature may be defined as the temperature at which the energy absorbed is 15 ft.-lb. in a V-notch Charpy test. Accordingly, as used throughout the present disclosure, a metal is defined to be substantially embrittled when it is below its ductile to brittle transition temperature, or below $-50°C$, whichever is lower. For plastics and rubbers, substantial embrittlement is defined as being at a temperature below $-50°C$.

In the case of a material consisting of numerous components, the composite material is considered to be substantially embrittled for purposes of the invention when the component desired to be fragmented is substantially embrittled as defined above.

The nature of the brittle fracture resulting from an explosive impact, namely, the size and shape of the fragmented material, is a function of many variables. Included among these are the bulk density, the temperature to which the material is cooled, the composition of the material, the weight ratio of explosive to material, and the relative placement of the explosive charge. Generally, the higher the bulk density the lower the weight ratio of explosive necessary to effect fragmentation. Also, the lower the temperature to which the material is chilled, the lower the weight ratio of explosive necessary to effect fragmentation. Thus, the process of the invention can be carried out at a temperature of about $-50°C$ or below, with the explosive required for fragmentation ranging from about 1/20 to 1/7,000 lb. explosive/lb. solid material, or expressed alternatively in terms of liberated energy, the explosive range is from about 100 to 0.3 joules of energy/gram of solid material. The process of the invention will in general be carried out over a preferred temperature range of from about −50°C to about −196°C. In most cases, determining the optimum conditions for fragmentation involves a tradeoff of competing considerations. Frequently, the economics of cryogenic refrigeration will be the overriding factor and therefore will dictate, in a given situation, the temperature to which the material is cooled and hence the required weight of explosive.

Another use for the present invention is for the demolition of structures such as buildings, bridges and the like by fracturing its supporting structural members. In accordance with the art of demolition, the explosive discharge is not intended to fracture the entire structural member, but rather, the charge is used to collapse the member at a strategic point so that bricks and other material will collapse with sufficient force to break up into easily handled piles of rubber. Although, conceptually, the structural member need only be fractured along its cross-section, nevertheless, a localized region corresponding to a length of from about 0.5 inches to 2 inches of the member must be cooled to cryogenic temperatures to effect a proper fracture. Accordingly, in such a case the calculated weight ratio of explosive to material is based on the weight of material corresponding to this length. That is, the cross-sectional area of the structural member multiplied by the above mentioned length defines the volume of material to be fractured which, in turn, defines the weight of explosive required for fragmentation. Generally, only relatively small amounts of explosive are necessary because of the inherent efficiency of the process of the invention. Indeed, this process requires only about 1 percent of the explosive necessary for demolition at ambient temperature, thereby obviating the severe air blast, ground shocks and shrapnel which accompany conventional demolition.

DRAWINGS

FIG. 2 is a graph illustrating the effect of the state of stress on the mechanical deformation of a mild steel specimen at −196°C.

DETAILED DESCRIPTION

Figure 1:
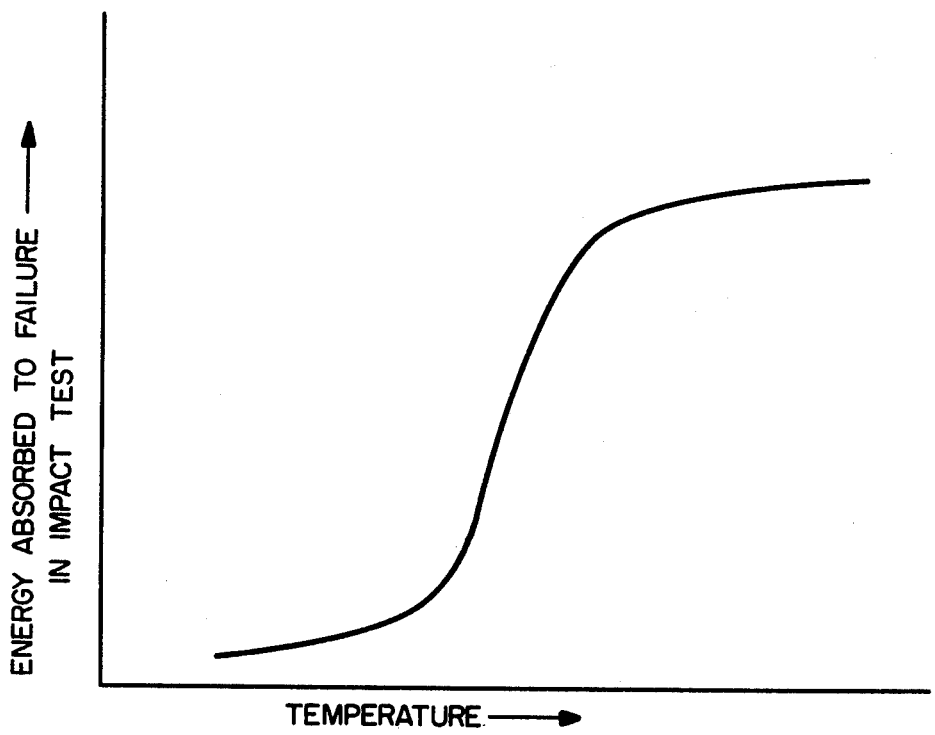
FIG. 1 is a graph showing the typical behavior of a notched beam in a Charpy test, illustrating the effect of temperature on the energy absorbed to failure.

The method of the present invention has broad application to diverse arts and accordingly can be used to provide efficient processes for fragmenting materials, for reclaiming desired metal values from scrap metal, as well as for the demolition of buildings. The flexibility of the process is due, in part, to its being able to fragment a wide variety of solid materials and produce a broad size range of fragments simply by varying the amount of the explosive charge and its relative placement proximate to the material. This advantage is not present in processes using hammermills to effect fragmentation. Further flexibility in the method of this invention may be achieved by choice of the configuration of the explosive charge. In particular a shaped charge may be used, and preferably detonated on the surface of the material; a shaped charge being an explosive which is hollowed out, for example, in the shape of a hollow cone. Moreover, the medium in which the material is contained may be varied. The method of this invention is particularly advantageous for fragmenting ferrous scrap such as automotive scrap, appliances, motors, generators and home scrap from steel mills.

The solid material to be fragmented in accordance with the invention is cooled, for example by mechanical means of refrigeration, or preferably, with a cryogenic refrigerant, such as liquid nitrogen, to a temperature at which it becomes substantially embrittled. Ferrous scrap is substantially embrittled at temperatures below about −50°C. Considerations of cost and convenience will in part determine the method of refrigeration which is employed in a given situation. In the demolition of a steel structure in accordance with the invention, for example, cooling of the solid material in question may be conveniently effected by directly contacting said material in-situ with a cryogenic refrigerant. This may be done simply by wrapping the solid material to be cooled with an absorbent cloth or paper and then wetting the absorbent layer with the liquid refrigerant prior to detonation. Pretreatment of the solid material prior to chilling will depend on its size and bulk. Thus, for a recyling operation involving scrap material, such as an automobile hulk, the solid material is preferably compressed for ease of handling. After being embrittled, the solid material is fragmented by detonating an explosive charge proximate thereto. After fragmentation, the desired metal values of the material may be recovered. For example, scrap which comprises both ferrous and non-ferrous components, such as automotive scrap, motors and generators, may be fragmented and separated by processes such as magnetic separation or air classification.

The invention is particularly well suited for refrigeration recovery because of the extremely low temperature rise suffered by the fragmented solid material as a result of the detonation. Since the cost of refrigeration is generally one of the major operating costs of all cryogenic fragmentation processes, the present invention, can therefore, be used to great advantage in conjunction with known methods of refrigeration recovery. U.S. Pat. No. 3,666,185 to Williams, illustrates various techniques for the recovery of the refrigeration.

EXAMPLE 1

Experiments were performed with mild steel cylinders at various temperatures, mild steel having a ductile to brittle transition temperature of about −50°C. Two cylinders, each weighing 207 grams, having a 0.24 cm. wall thickness, a diameter of 2.5 cm. and a length of 15.2 cm. were internally loaded at the center with 0.87 and 1.75 grams of PETN explosive, respectively. The explosive was detonated with the solid material at room temperature. Substantial plastic deformation occurred in both cases with only localized fragmentation in the vicinity of the explosive.

The same experiment as described above was performed, except that the explosive was detonated with the solid material at −196°C. The cylinders fragmented in a brittle manner extensively throughout their length. The higher weight of explosive produced a smaller size of fragmented product.

EXAMPLE 2

Spherical charges of Detasheet C explosive (63 percent PETN, 8 percent nitrocellulose, balance filler) weighing 0.5 and 1.5 grams, respectively, were placed against the center of 5.1 ± 15.2 ± 6.305 cm. steel plates weighing 186 grams. The explosive was detonated with the solid material at room temperature. Slight plastic bending was observed and no fragmentation.

The same experiments as described above were performed, except that the explosive was detonated with the solid material at −196°C. The plates readily fragmented in a brittle manner throughout the extent of the material. The number of fragments generated increased with the higher weight of explosive.

EXAMPLE 3

Tests were conducted with 10 kg. automobile generators, the ferrous components of which are substantially embrittled at about −50°C. The object of the test was to fracture the ferrous components so as to release the copper. Six grams of Detacord C explosive (63 percent PETN, 8 percent nitrocellulose, balance filler) were detonated in the hollow armature shaft at room temperature in air. The generator was only slightly damaged. The same experiment, as described above, was repeated except that the explosive was detonated when the solid material was at a temperature of −196°C by keeping it in a paperboard box filled with liquid nitrogen. All the ferrous components were shattered and were readily separated from the copper windings which were not embrittled and remained substantially intact.

EXAMPLE 4

To illustrate the significance of placement of the explosive charge, the experiment described in Example 3, which was conducted in liquid nitrogen, was repeated except that the charge was placed on the outside wall of the automobile generator rather than in the hollow armature shaft. The subsequent detonation was only able to shatter the outside shell while the armature was left intact.

This experiment illustrates a significant advantage of the present invention, namely, the possibility of specifically placing the charge to produce forces at a strategic location. This advantage is not present in conventional processes using hammermills to effect fragmentation. Such processes are, generally, incapable of fracturing the armature of the generator. Indeed, this is why hand dismantling of generators is the preferred method in conventional practice.

EXAMPLE 5

To illustrate the effect of detonation in air and in liquid nitrogen, a generator, identical to those used in Examples 3 and 4, was loaded with 10 grams of Detasheet C and detonated at −196°C. The ferrous components were shattered and the copper windings remained intact. By way of comparison, only 6 grams of Detasheet C were required to produce a comparable product when the detonation occurred in liquid nitrogen at −196°C, as described above in Example 3.

EXAMPLE 6

Experiments were conducted with 30 cm. × 30 cm. × 36 cm. 50 kg. blocks cut from a baled car (bundled number 2 steel). The object of the experiment was to fracture the ferrous components and allow their subsequent separation from the non-ferrous components of the car body. Each block had a hole cut into its center. The block was explosively loaded with 30 grams of Detasheet C and detonated at room temperature in air. This corresponds to a weight ratio of 1/1667 (lb. of explosive/lb. of material). Some plastic deformation was observed with no significant fragmentation.

The experiment described above was repeated, except that the explosive was detonated with the solid material at −196°C in liquid nitrogen. The block was extensively fragmented throughout its volume. The largest fragment was a fist sized piece at one corner of the block. Fragments of sheet metal had typical dimensions of 5 cm. × 5 cm. Sixteen grams of copper wire were easily removed from the fractured metal. The maximum temperature rise in the material, determined by the total caloric energy of the explosive, was less than 10°C. This is significant, since the low temperature rise, as compared to conventional cryogenic fragmentation processes using hammermills, makes it economically attractive to partially recover the cryogenic refrigerant.

EXAMPLE 7

An experiment was performed with a steel billet weighing 42 kg. In conventional practice, 5 kg. of explosive are required at room temperature to shear the block into two pieces. 42 grams of Detasheet C were placed in a 2.5 cm. diameter hole along the axis of the block. The explosive was detonated with the solid material at −196°C. The billet fractured extensively throughout its volume into pieces having a typical weight of 2 kg. The behavior of the billet is believed to closely resemble the behavior of large pieces of home scrap produced during steelmaking practice.

EXAMPLE 8

Experiments were conducted to demonstrate the feasibility of the cryogenic explosive demolition of steel structures. Four gm. of Detasheet C were attached to a U-channel 50.8 cm. long. The width of the central section was 12.7 cm. Each of two side sections was 5.1 cm. wide. The thickness of the steel varied between 0.64 cm. and 1.3 cm. Absorbent paper was taped to the channel and a plastic tube inserted between the paper and the channel. Liquid nitrogen was applied to the paper until air was seen to condense in the channel (−184°C), at which time the explosive was detonated. The U-channel was fragmented locally across its entire cross section.

EXAMPLE 9

Experiments were performed with 2 inch diameter cylinders of low density polyethylene, 4 inches long. The cylinders, weighing 189 gm., were centrally loaded with 1 gm. of PETN in the form of Primacord. When the experiment was performed at room temperature, the cylinder was not fractured. At −196°C in liquid nitrogen, the cylinder was broken into pieces smaller than 1 cm. Part of the plastic was reduced to a fine powder.

EXAMPLE 10

Experiments were performed with gum rubber tubing. Three parallel pieces of tubing in contact with each other, at room temperature, were externally loaded by placing 1 gm. of Primacord in the interstice so formed. Detonation of the explosive did not damage the rubber. When the solid material was cooled to −196°C prior to detonating the explosive, the rubber was broken into particles smaller than 1 cm. A portion of the product was reduced to a fine powder.

EXAMPLE 11

Experiments were conducted to demonstrate the effect of the state of stress on the mechanical deformation of different specimens of mild steel at the same temperature. Mild steel specimens were deformed in uniaxial tension and uniaxial compression at $-196°C$. These results are shown in FIG. 2. The sample that was subjected to uniaxial tension showed no plastic strain and fractured in a brittle manner. The sample that was subjected to the uniaxial compression showed extensive uniform plastic strain. This demonstrates the importance of avoiding uniaxial compressive stresses when fracturing a material.

What we claim is:

1. A process of fragmenting scrap metal so that the ferrous and non-ferrous components of said scrap metal can be readily separated comprising the steps of:
   a. chilling the scrap metal to be fragmented to a temperature at which it is substantially embrittled, and
   b. detonating an explosive proximate to said chilled scrap metal so as to fracture said scrap metal.

2. The process of claim 1 wherein said scrap metal is chilled to a temperature of from about $-50°C$ to $-196°C$.

3. The process of claim 1 wherein said explosive liberates from about 100 to 0.3 joules of energy per gram of material to be fragmented.

4. The process of claim 1 wherein the explosive is at least, in part, a shaped charge.

5. The process of claim 1 wherein said scrap metal is ferrous scrap.

6. The process of claim 1 wherein said scrap metal is copper bearing scrap.

7. The process of claim 1 wherein said scrap metal is copper bearing scrap and further including the step of separating the copper metal from the fragmented residue.

8. The process of claim 1 wherein said scrap metal is ferrous scrap and further including the step of magnetically separating the ferrous fragments from the remaining material.

9. The process of claim 1 wherein said scrap metal is home scrap from steel mills.

10. The process of claim 1 further including the step of recovering the refrigeration from the fragmented scrap metal.

11. A process for demolishing steel structures comprising the steps of:
   a. chilling a preselected area of the steel structure to be fragmented to a temperature at which said steel is substantially embrittled, and
   b. detonating an explosive proximate to said steel structure so as to fracture said preselected area of said steel structure.

* * * * *

UNITED STATES PATENT OFFICE
CERTIFICATE OF CORRECTION

Patent No. 3,878,787    Issue Date April 22, 1975

Inventor(s) J.B. Lightstone et al

It is certified that error appears in the above-identified patent and that said Letters Patent are hereby corrected as shown below:

In column 4, line 13, correct the spelling of the word "herein".

In column 6, line 67 replace "5.1 $\pm$ 15.2 $\pm$ 6.305" with -- 5.1 x 15.2 x .305 --.

In claim 1, line 1, replace "of" with -- for --.

Signed and sealed this 24th day of June 1975.

(SEAL)
Attest:

RUTH C. MASON
Attesting Officer

C. MARSHALL DANN
Commissioner of Patents
and Trademarks